(No Model.)
G. T. REED.
CUSHIONED TIRE.
No. 476,215. Patented May 31, 1892.
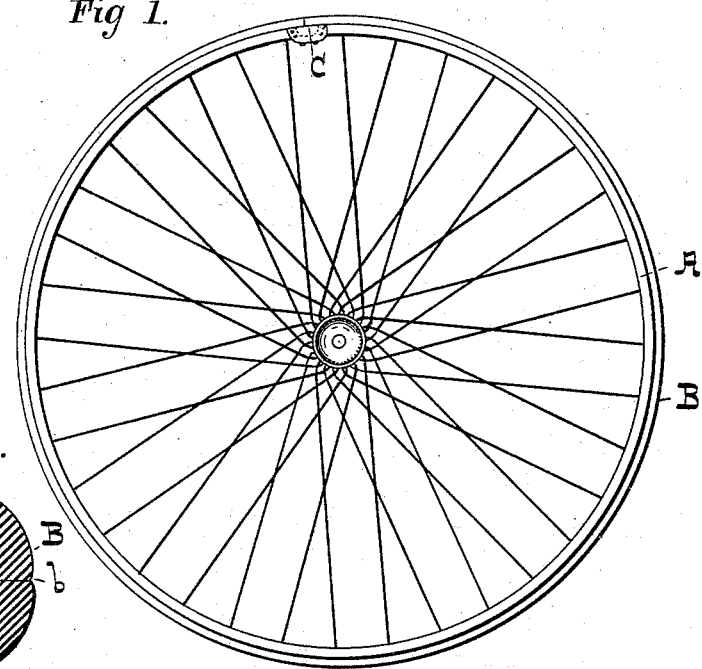
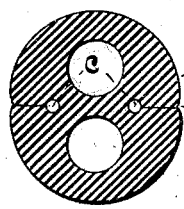
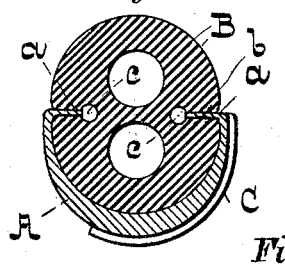
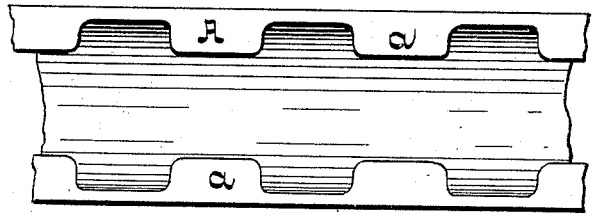
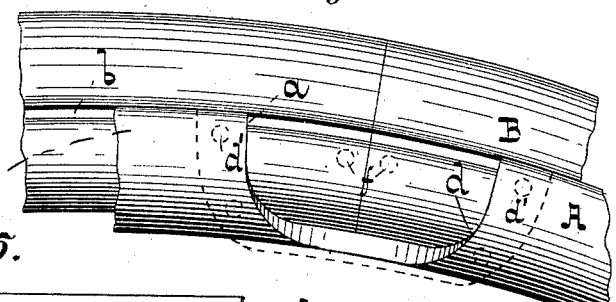
WITNESSES —
Dan'l Fisher
Howard S. Kirk
INVENTOR —
George Thorn Reed,
by G. H. & W. T. Howard,
Attys.

UNITED STATES PATENT OFFICE.

GEORGE THORN REED, OF BALTIMORE, MARYLAND, ASSIGNOR OF ONE-HALF TO HESTON A. CHEATHAM, OF SAME PLACE.

CUSHIONED TIRE.

SPECIFICATION forming part of Letters Patent No. 476,215, dated May 31, 1892.

Application filed September 14, 1891. Serial No. 405,624. (No model.)

*To all whom it may concern:*

Be it known that I, GEORGE THORN REED, of Baltimore, Maryland, have invented certain Improvements in Cushioned Tires for Bicycle-Wheels, of which the following is a specification.

The serious objection to bicycle-tires of the above description is their defective attachment to the rim. The ordinary cushioned tire consists of a rubber tube, which is secured within the grooved rim of the wheel by the application of cement. The cemented portion of the tire is necessarily rigid, and the easy movement of the wheel and the comfort of the rider in traveling are thereby diminished. The concussion in moving over uneven surfaces tends to displace the tire by loosening or disrupting the cement, which is especially liable to rot or disintegrate from the passage of the wheel through mud and water and its subsequent drying. When the tire becomes loose, the whole machine is rendered unserviceable until the tire is repaired, which entails considerable cost and loss of time.

My invention eliminates these defects as mentioned; and it consists in discarding the use of cement for joining the tire and rim together. By my plan the tire and rim of the wheel are united by mechanical means solely, the flexibility of the tire is increased, and its position on the rim can be readily reversed, whereby the unworn portion of the tire will be brought to the periphery and made the wearing-surface of the wheel. The durability of the tire is thereby increased and its existence is doubled. The flanges and sides of the rim are made thin, so as to be flexible and impart elasticity to the rim.

In the description of my invention which follows reference is made to the accompanying drawings, forming a part hereof, in which—

Figure 1 is a side view of a bicycle-wheel provided with my improvements. Fig. 2 is an enlarged cross-section of the improved tire before its attachment to the rim, and Fig. 3 shows the improved tire and the improved rim with thin flanges and sides connected. Fig. 4 is an exterior side view of a part of the rim and tire, showing particularly the means employed to admit of the entrance of the tire to the grooved rim. Fig. 5 is a top or outside view of a part of the rim, illustrating a modification in the construction of the same. Fig. 6 is a view similar to Fig. 3, except that a modified form of the tire is employed.

Referring to the drawings, A represents the rim of the wheel, consisting of a grooved metallic bar of annular shape. The edge of the rim is provided with inwardly-extending flanges $a$, which may be continuous around the circumference, as shown in Figs. 3 and 4, or a series of thin similar flanges may be used, as shown in Fig. 5.

B is a cushioned tire consisting of a rubber tube, showing an oblong cross-section and having at its sides grooves $b$ of a width less than the thickness of the flanges of the rim, which grooves preferably terminate in channels $c$ of a width greater than the thickness of the flanges $a$ of the rim and which extend longitudinally within the tire. The object of these channels is to prevent tearing of the rubber as the tire is affixed to the rim, as hereinafter described.

In attaching the tire to the rim the flanges $a$ are forced into the grooves $b$, which are opened in the act of attachment. Manifestly a continuous tire or a tire of annular form could not be stretched over the edges of the rim or the flanges inserted in the grooves. I therefore provide in one side of the rim a slot or opening $d$, extending to the bottom of the groove, through which the tire, in the form of a straight piece, is inserted. This slot or opening is subsequently closed by means of a plate C, (shown in Figs. 1 and 3 and in dotted lines in Fig. 4,) attached by screws $d'$, and other screws or rivets $f$ are passed entirely through the said covering-plate and the ends of the tire to keep them in position. By taking out the screws or rivets a worn tire may be removed and its position reversed, after which it may be applied to the rim and a new unworn surface exposed at the periphery of the wheel. Should any objection be raised to the rim having an opening in its side covered by a plate, the rim may be cut at some point and the separated ends moved laterally from each other, so as to expose the cross-section of the rim. After the flexible tire is placed in position the cut ends of the rim are brought together and a plate secured over the joint. The worn surface of the tire, which is then at the inner circumference, is not seen and it does not interfere with the application of the tire to the rim. Indeed, in some cases a tire with a portion of its inner circumference removed is shown in Fig. 6, which may represent either a worn tire which has been reversed in position or a new tire with a flat base. This tire is not reversible.

I claim as my invention—

1. In a wheel, a hollow-faced metallic rim having an inwardly-projecting flange on each of its edges and an opening at one of its sides, combined with a flexible tube adapted to be drawn through said opening and to rest in the hollow of the rim, said tube having a groove at each side normally of less width than the thickness of said flanges and into which grooves the flanges are forced as the tube is drawn into position, said grooves terminating in channels of greater width than the thickness of the flanges, for the purpose specified.

2. In a wheel, a hollow-faced metallic rim having an opening at one side thereof, combined with a flexible tire adapted to be drawn through said opening and to rest in the hollow of the rim, a plate to cover said opening when the tire is in position, and rivets or screws passing through the said plate, the abutting ends of the tire, and the metallic rim to secure the several parts together, substantially as described.

GEORGE THORN REED.

Witnesses:
WM. T. HOWARD,
DANL. FISHER.